Feb. 6, 1968     B. B. BECKER     3,367,440
ELECTRIC AND HYDROSTATIC DRIVE SYSTEM FOR WHEELED VEHICLE
Filed June 2, 1965     3 Sheets-Sheet 1

Inventor:
Bernard B. Becker,
By Russell, Chittick & Pfund
Attorneys

Feb. 6, 1968 — B. B. BECKER — 3,367,440
ELECTRIC AND HYDROSTATIC DRIVE SYSTEM FOR WHEELED VEHICLE
Filed June 2, 1965 — 3 Sheets-Sheet 2

Inventor:
Bernard B. Becker,
by Russell, Chittick & Pfund Attorneys

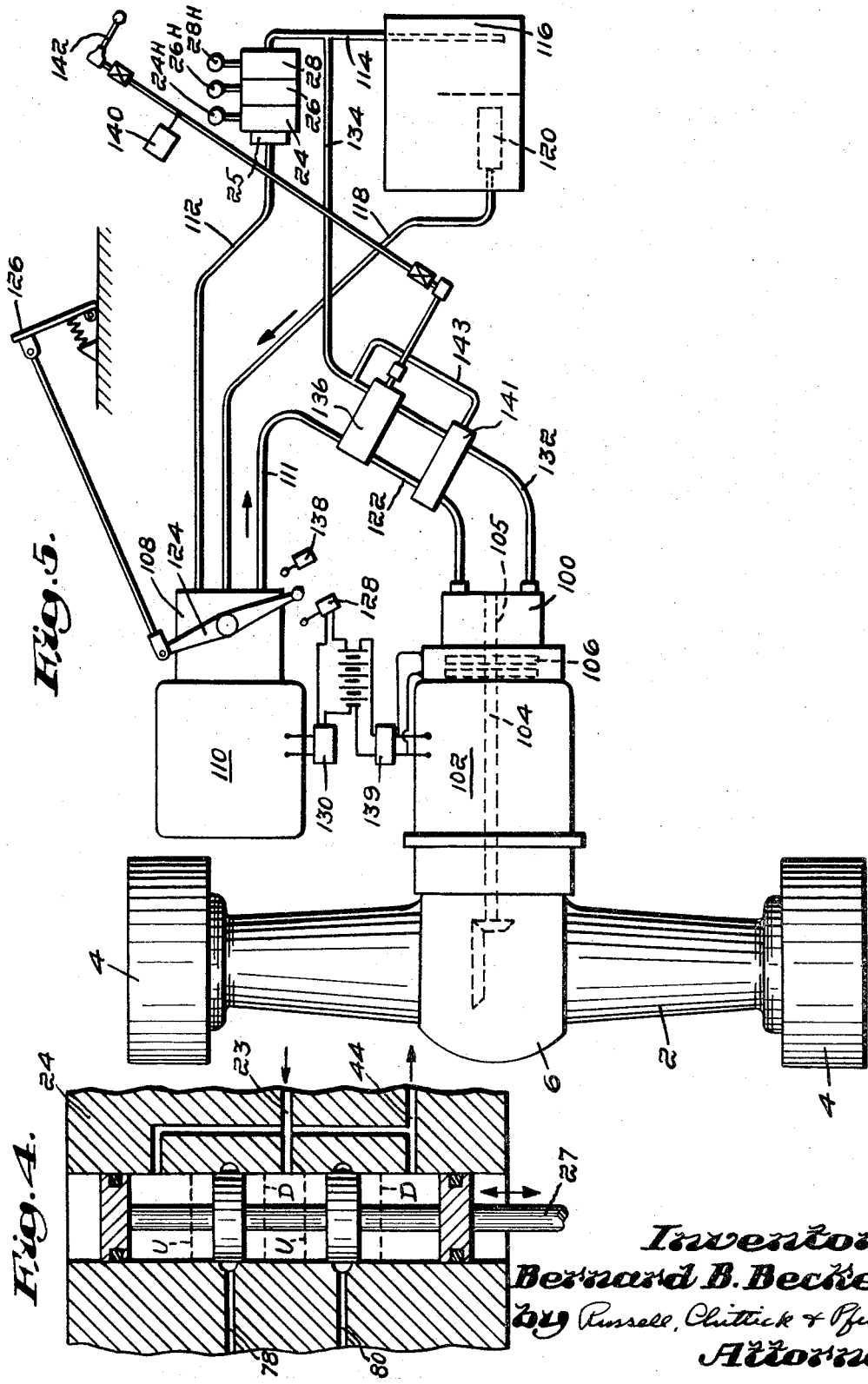

United States Patent Office 3,367,440
Patented Feb. 6, 1968

3,367,440
ELECTRIC AND HYDROSTATIC DRIVE SYSTEM
FOR WHEELED VEHICLE
Bernard B. Becker, Belmont, Mass., assignor to Lewis-Shepard Company, Watertown, Mass., a corporation of Massachusetts
Filed June 2, 1965, Ser. No. 460,650
10 Claims. (Cl. 180—65)

ABSTRACT OF THE DISCLOSURE

Means for driving a material handling truck (although not limited thereto) through its starting and accelerating speeds by means of a fluid pump and fluid motor directly connected with the vehicle transmission. When the vehicle has reached full speed, automatically operating means shifts the drive from the fluid motor to an electric motor which is then running at its full speed. The electric motor speed and the vehicle speed are substantially matched at the time of shift so that the transition is smoothly accomplished. The vehicle speed is under the manual control of the operator, but the shifting from fluid motor drive to electric motor drive occurs automatically to provide maximum efficiency.

Brief description of the invention

This invention relates principally to material handling trucks, but it is also applicable generally to wheeled vehicles which require a drive system for propelling the vehicle and a second power system for operating collateral equipment which may or may not function simultaneously with the truck driving system.

While the description of the invention will be made in relation to its incorporation in a material handling truck, it is to be understood that the invention is not to be limited thereby.

Material handling trucks commonly in use today include two direct current electric motors, both of which are battery powered. One of the motors, capable of running at variable speed, is of relatively low horsepower but large in size and is used to propel the truck by direct drive along the floor. The other motor, which runs at full speed when in operation, is usually of smaller physical dimensions but of higher horsepower and is used to actuate a hydraulic system which lifts the load or performs other related functions unassociated with the propulsion of the truck. The power requirements for load lifting are ordinarily greater than those required for moving the truck horizontally along the floor or up the grades customarily encountered.

While hydrostatic drive systems could be used to propel electric trucks, they are ordinarily not used becaused of their inherent inefficiency. For example, if the electric motor efficiency is .75, the pump efficiency .75 and the hydraulic motor efficiency .75 then the efficiency of the complete system would be only 42%. On the other hand, the hydraulic drive system gives infinite speed variation and can be effectively used for starting, inching and accelerating, which are the conditions under which the ordinary direct drive electric motor operates at least efficiency.

In a conventional truck drive system, the electric motor drive shaft is directly geared to the wheels. The motor speed is controlled by resistors in the line. At full speed, with all resistors cut out, the efficiency is superior to the hydrostatic drive system.

On the other hand, in the acceleration or low speed range, the hydrostatic system can be made much more efficient than the conventional direct drive with either the step type or variable resistance for speed control because the work input can be precisely proportioned to wheel torque demand by controlling the quantity of fluid being pumped. In the hydrostatic system, the electric motor that drives the pump runs at full speed at all times, producing maximum efficiency in the electric motor.

There are further advantages inherent in the hydrostatic system. Since the electric motor or motors when running are turning at full speed, more effective cooling by means of a fan or blower on the motor shaft is possible. This in turn would permit safe operation of the electric motor for a longer time or, where shorter duty cycles might be contemplated, a smaller motor could be used.

Experience has shown that the temperature of relatively constant speed electric motors operating at full speed output can be held substantially below that of motors operating in conventional truck drive systems in which the motor speed and that of the associated fan varies with the drive wheel speed from maximum to zero. Thus, in conventional systems, in which the motor starts under load, the fan is least effective in the low range of motor speeds at which efficiency is low and heating is greatest. In the proposed system, the motor and starting contactors are subjected to only a fractional part of the starting electric current because the motor reaches full r.p.m. before the variable pump starts to deliver fluid to the system.

Accordingly, the present invention contemplates utilizing the inherent advantages of speed control, high accelerating torque and fluid braking of the hydrostatic system for starting, inching and accelerating, and the greater efficiency of the direct drive electric motor in the top speed range. This is achieved by incorporating means which will automatically shift the drive from one to the other when the truck has reached the proper speed. Conversely, when deceleration occurs, the electric motor that has been driving directly at full speed is automatically disconnected and the hydrostatically driven motor comes into operation to provide fluid braking and the other advantages of the hydrostatic system at low speeds.

In current conventional trucks, it is customary to have one electric motor for driving the hydraulic pump used in raising and lowering the work carrying means and for tilting the work supporting posts. A separate motor is used for driving the truck. In the present invention, however, the electric motor that drives the pump for elevating and tilting is also used for the hydrostatic traction drive. In addition, in one form of the invention, this same electric motor drives the truck through direct engagement with the transmission when the hydrostatic drive is disengaged. On the other hand, if two electric motors are used, one actuating the pumps and the other providing the direct drive at high speed, both may be made the same size physically since the direct drive motor would no longer have the task of accelerating the truck. Instead, it would merely drive the truck in its upper speed range while running at maximum efficiency. The two motors could be of different horsepower while of the same external dimensions. This would result in certain manufacturing economies.

In the description of the invention which follows, two arrangements will be shown, one in which only a single electric motor is used and another in which two electric motors are used. It will, of course, be appreciated that the electric motor driving the pump of the hydrostatic system advantageously also drives the lifting and tilting hydraulic systems but, if desired, still a third motor could be introduced for driving the lifting and tilting systems independently of the hydrostatic traction drive system. In all cases, however, the motor or motors are driven ordinarily and preferably by a single source of current and the arrangement is such that the motor or motors are, when operating, running at speeds close to those of maximum efficiency.

The foregoing advantages will be more fully understood as the description proceeds with the aid of the accompanying drawings in which:

FIG. 4 is an enlarged view of a conventional valve that may be used in controlling the direction of flow of fluid from the pumps; and FIG. 5 shows a modification in which there are two electric motors, one driving the hydraulic system for both traction and lifting and tilting and the other for driving the truck at high speed after the hydrostatic system has been disconnected.

Figure 1:
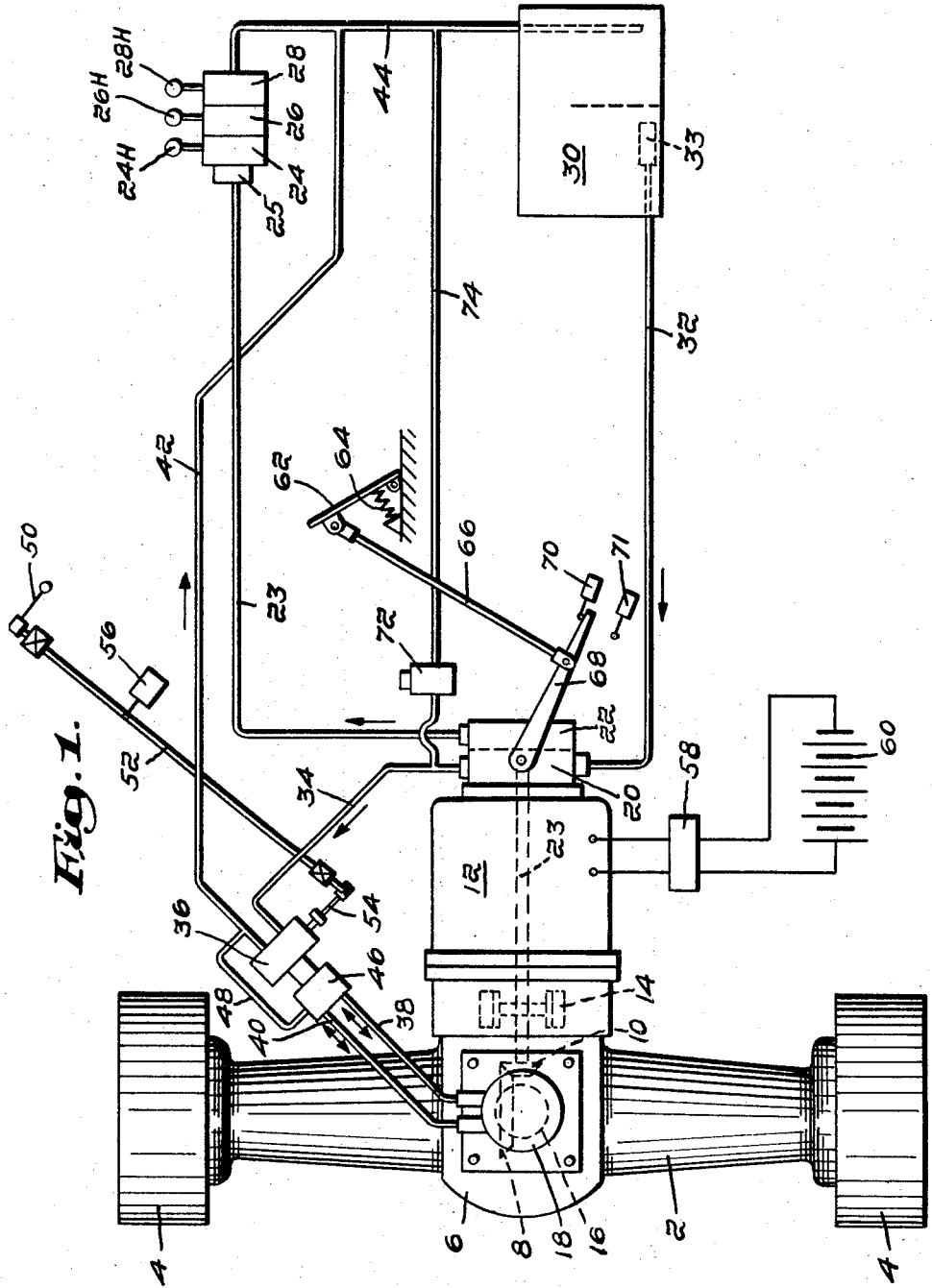
FIG. 1 shows a single electric motor for driving the truck by direct connection to the transmission at high speed and by the hydrostatic system for starting and accelerating. This single motor also operates the pumping system for lifting and tilting.

Referring first to FIG. 1, it will be understood that this is representative of the truck driving system and the lifting and tilting mechanisms although the details of the body, the other supporting wheels and the material handling portions have been entirely omitted as they constitute no part of the invention. The traction drive mechanism comprises an axle housing 2 on the ends of which are wheels 4 driven in conventional manner from the transmission 6 which will ordinarily include conventional differential gearing. For illustrative purposes, the transmission is represented by a bevel gear 8 which drives the axles and wheels. Gear 8 is driven by either the bevel gear 10 which is connected to an electric motor 12 by clutch 14 or by bevel gear 16 on the output shaft of a fluid motor 18 mounted above the transmission. The gears 10 and 16 are in permanent mesh with gear 8 but only one of the gears 10 or 16 is applying a driving force to gear 8 at any time.

On the righthand end of electric motor 12 are two fluid pumps 20 and 22, both driven by and direct connected to motor shaft 23. Pump 20 provides the fluid flow which drives fluid motor 18, while pump 22 provides the fluid flow to actuate the material handling equipment, which elements are controlled by the operator through the valves 24, 26 and 28 manually actuated through movement of control handles 24H, 26H and 28H. A fluid supply tank 30 feeds the hydraulic system through pipe 32 which leads to the intakes of both pumps 20 and 22. A filter 33 is preferably in the line 32. The outlet from pump 20 is through pipe 34 into forward and reverse valve 36. If we consider forward movement of the truck to be to the right in FIG. 1, then when the truck is moving forward valve 36 will be set so that fluid will flow through pipe 38, thence through fluid motor 18 to return by pipe 40, bypass 48 and on through pipe 42 to return through pipe 44 to the tank 30.

The hydrodynamic brake 46 comes into operation whenever fluid is being fed by pump 20 to the motor 18 at a rate less than that necessary to maintain truck speed. Whenever the truck speed and the resulting fluid motor speeds exceeds the point where the amount of fluid deliveded by pump 20 is insufficient to keep the motor 18 filled, motor cavitation and heating will be prevented by cool fluid being drawn from tank 30 through one or other of motor replenishing check valves 88 and 90 (see FIG. 2).

Forward and reverse valve 36 is controlled by the operator through suitable movement of a directional control lever 50 which rotates shaft 52 to shift the rod 54 back and forth, thereby to move the valve 36 to either forward or reverse position. Valve 36 might take the form of the valve shown in large section in FIG. 4. This construction is conventional and will be explained in detail hereinafter.

Figure 3:
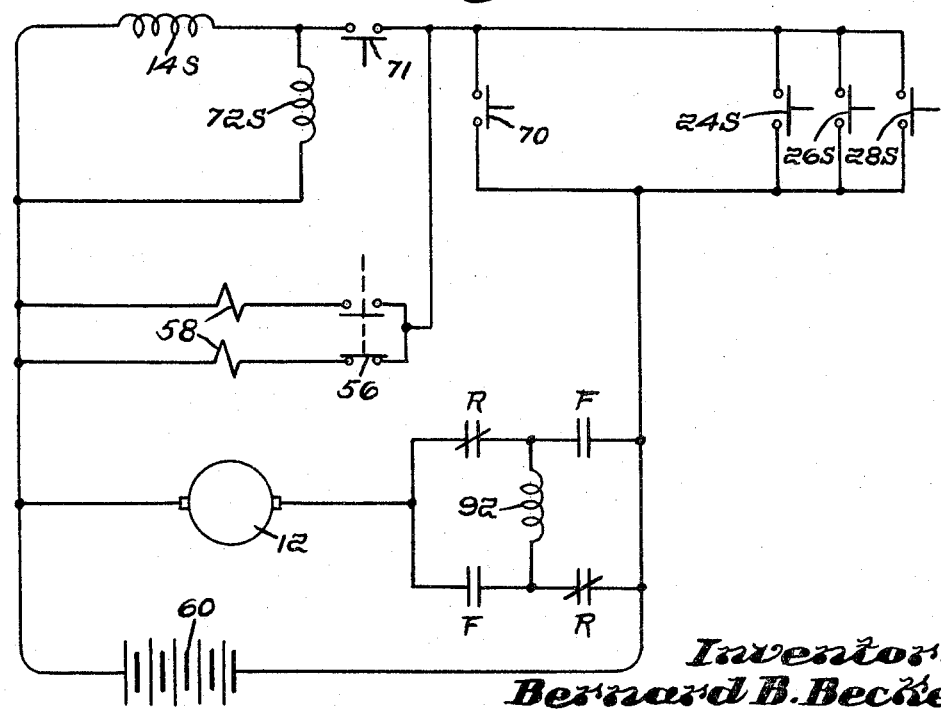
FIG. 3 is a wiring diagram of the FIG. 1 construction.

As the directional control lever may be swung one way or the other, it shifts the contacts in a forward and reverse switch 56 which, through suitable circuitry shown in FIG. 3, causes the forward or reverse contactor 58 in the electric motor circuit to assume a suitable position for driving electric motor 12 in the selected direction. Power is provided by a battery 60 of adequate capacity. Fluid pumps 20 and 22 function with equal effectiveness regardless of the direction of rotation of motor 12.

In the actuation of the arrangement shown in FIG. 1, the direction and speed of the truck is at all times under the control of the operator. The directional control lever 50 is moved to a setting which will give the correct direction of truck movement. A foot actuated speed control pedal 62 normally held in off position by a spring 64 is progressively depressed by the operator, causing the link 66 to commence clockwise movement of control arm 68. In so doing, the starting switch 70 is closed. This puts motor 12 into operation and rotation is in the direction that will move the truck in the selected direction. At this point, however, there is no movement of the truck because there is no flow of fluid through pipe 34 and clutch 14 is open. As arm 68 is further depressed, fluid commences to flow through pipe 34, with the volume of fluid flow increasing as arm 68 is further depressed. Thus in accord with the position of arm 68, a controlled volume of fluid flows through pipe 34, through valve 36 which directs it through either pipe 38 or 40 according to the direction selected, and thence through fluid motor 18 to cause rotation of gears 16 and 8 and wheels 4. Movement of the truck in this manner is initiated in the selected direction.

Since the mechanism in pump 20 controlled by pedal 62 permits variable flow of fluid through pipe 38, the speed of the truck can be very accurately controlled. The truck can be inched along or can be slowly or quickly accelerated as the arm 68 may be moved by the operator through actuation of the speed control pedal 62.

Through all of this starting and accelerating period, the motor 12 is running at optimum speed. This speed is relatively uniform, varying slightly with the load. Since no resistances are present in the power supply line, the motor 12 is also operating at maximum efficiency.

When arm 68 has moved to a position where the truck is up to maximum speed provided by the fluid motor 18, the lever 68 will have engaged the clutch control switch 71. When this switch is closed, two things happen substantially simultaneously. Clutch 14 is engaged through actuation of a suitable solenoid 14S (see FIG. 3) and an unloading valve 72 is opened through operation of solenoid 72S. Thus the high volume of fluid emerging from pump 20 flows through bypass 74 back to tank 30 instead of being fed to the fluid motor 18 through pipe 34.

In this way, driving of the truck is shifted from the hydraulic system to a direct drive from motor 12 through clutch 14 and bevel gear 10 to bevel gear 8 connected to the driving axles and wheels 4. At the time clutch 14 closes, the truck speed and electric motor speed will be approximately matched so that the transition from fluid motor drive to direct drive is smooth and easy and without any substantial jolting of the truck or excessive strain on the transmission.

When the operator wishes to slow down, he lets up on speed control pedal 62. This opens switch 71 which disengages clutch 14 and closes unloading valve 72, automatically putting fluid motor 18 back into operation. If the lever 68 is allowed to swing all the way up, the starting switch 70 will be opened and electric motor 12 will be deenergized, permitting the truck to be braked to a full stop.

Accentuated hydrodynamic braking occurs when the operator "plugs" or reverses the position of valve 36 to block return flow to tank 30 and causing an immediate build up in pressure in brake relief valve 86.

Figure 2:
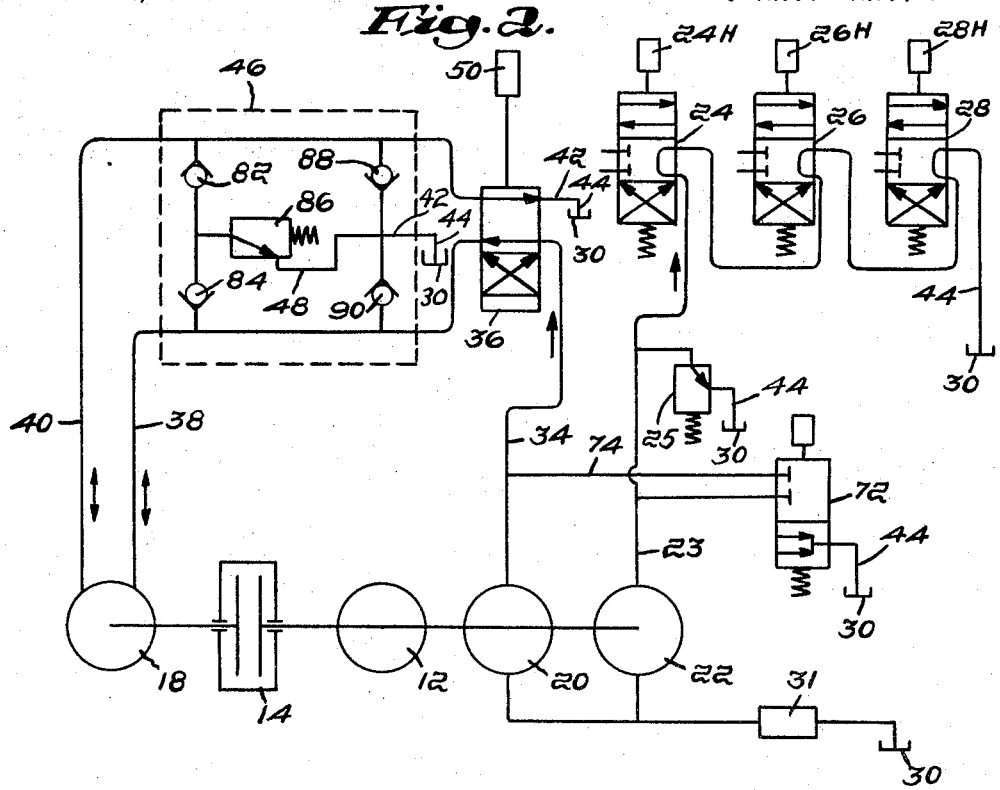
FIG. 2 shows the piping, valving and clutch system of the arrangement shown in FIG. 1.

The foregoing explanation and elements will now be related to the disclosure of the hydraulic and electrical circuits in FIGS. 2 and 3 to which the same numerals have been applied as in FIG. 1.

The three identical valves 24, 26 and 28 used in controlling the material handling devices are shown in detail in one conventional form in FIG. 4. When the piston portion 27 is moved up to dotted line position U, fluid flows in through port 23 and out to the actuating mechanism through port 78, back through port 80 and thence to the tank 30 through port 44. When the valve is moved down to the dotted line position D, the flow through the actuating mechanism is reversed, flowing out through port 80 and back through port 78. Valves 24, 26 and 28 all have a neutral position which is that of piston 27 shown in FIG. 4.

Forward and reverse valve 36 may be similar to the construction of FIG. 4 with or without a neutral position. Preferably, valve 36 is a two-position valve, spring loaded to either direction with no neutral position as indicated in FIG. 2.

The hydrodynamic brake 46 shown in FIG. 2 also includes an overload relief means to prevent any danger to the hydraulic system should the pump 20 be opened wide while the truck was held by an outside force, such as an obstruction or too steep a grade, against movement. Excess pressure in the pipe 34 and 38 or 40, depending upon the setting of valve 36, will be bled off through either one or the other of valves 82 and 84 to pass through a spring controlled relief valve 86 and thence out through either valves 88 or 90 around valve 36 through pipe 48 to pipes 42 and 44 and thence to tank 30.

Referring to FIG. 3, it can be seen that the motor 12 is put into operation as soon as any one of the switches 70, 24S, 26S or 28S is closed. The direction of rotation of the motor will be determined by the position of switch 56 which, through the forward and reverse contactor coils 58, establishes the circuits through contactors R or F to determine the direction of current flow through the motor field 92. Thus when the truck is stationary or moving, the motor 12 when energized drives fixed flow fluid pump 22 to provide constant volume flow through pipe 23 so that the lift, tilt or other mechanisms may be actuated upon suitable movement of valves 24, 26 and 28.

Direct drive switch 71, closed upon sufficient movement of arm 68, will actuate clutch solenoid 14S to throw clutch 14 into engagement when the truck is up to proper speed. Closing of switch 71 also actuates the unloading valve solenoid 72S to open the unloading valve 72 so that the variable flow pump 20 no longer has any driving effect on fluid motor 18.

Reference will now be made to the modification shown in FIG. 5. There are two principal distinctions in this form over that shown in FIG. 1. First, there are two electric motors, the first electric motor driving the two fluid pumps and the second electric motor having mounted on its shaft the fluid motor which, when the second motor is not energized, drives the second motor shaft and armature to turn the gearing in the transmission. When the second electric motor is energized, then a clutch functions to disengage the fluid motor from the shaft of the second electric motor so that the driving of the transmission is caused solely by the second electric motor. These differences will become more apparent as the detailed construction of FIG. 5 is presented.

The axle 2, wheels 4 and transmission 6 are substantially the same as that shown in FIG. 1. Fluid motor 100 is mounted on the end of electric motor 102. Motor 102 is mounted on transmission housing 6. Shaft 104 of motor 102 is aligned with and connected to shaft 105 of motor 100 by a clutch 106 which automatically disengages when the truck has reached a suitable speed for electric motor 102 to take over the drive.

Fluid pressure to motor 100 is provided by a split flow pump 108 driven by electric motor 110. The variable delivery side of pump 108 is directly connected by pipe 111 to motor 100. The constant volume side of pump 108 supplies fluid continuously through pipe 112 to valves 24, 26 and 28, the fluid flowing ultimately from these valves through pipe 114 to reservoir 116. Relief valve 25 (see FIG. 2) is available to bypass excess pressure. The intake to pump 108 is via pipe 118, at the entrance to which is a filter 120. Variable delivery of fluid from pump 108 to motor 100 via pipes 111 and 122 is achieved through actuation of suitable pump valving under the control of lever 124, which is moved by the accelerator pedal 126 under the control of the truck operator.

When the accelerator pedal 126 is in off position, the lower end of arm 124 will engage pump switch 128 to hold it in open position with both motors 102 and 110 deenergized and the truck will be stationary. When accelerator pedal 126 is initially depressed, switch 128 closes, closing contactor 130 which puts pump motor 110 in operation. Fluid then commences to flow from the pump through pipes 111 and 122 to fluid motor 100 and away from the motor through pipe 132, thence through pipe 134 to the return pipe 114 to reservoir 116. A forward and reverse valve 136, manually controlled by the operator, is interposed in the lines 122 and 132 so that the direction of flow to fluid motor 100 can be reversed. Thus the operator, through selected positioning of valve 136, can control the direction of rotation of motor 100 and accordingly the direction of travel of the truck. Movement of accelerator pedal 126 will vary the fluid flow through pipe 122 to control the motor speed. The driving force of motor 100 is delivered to the transmission through engaged clutch 106 and shaft 104 of motor 102, which at this time is not energized.

Interposed between valve 136 and motor 100 is a hydrodynamic brake unit 141 and bypass 143 similar to the corresponding parts 46 and 48 shown in FIGS. 1 and 3 and functioning in the same manner.

When the truck has been fully accelerated by fluid motor 100, the lever 124 will reach and actuate switch 138, which sets up two circuits. One effects the opening of clutch 106 so that fluid motor 100 is no longer able to drive the truck through shaft 104. The other circuit then established puts motor 102 into operation. Since motor 102 is directly connected with the transmission 6, this motor, now energized, continues to drive the truck in the established direction. The direction of rotation of both fluid motor 100 and electric motor 102 is determined by the position of control lever 142 which moves both valve 136 and contactors 139 (the latter controlled by switch 140) to produce the same rotation.

Driving of the truck by motor 102 following disengagement of clutch 106 has no effect on the functioning of pump 108 which remains in operation so long as switch 128 is closed. Thus while the truck is moving, the valves 24, 26 or 28 may be operated, causing the fluid which is flowing in constant volume through pipe 112 to be diverted to actuate selected devices, such as the fork lift, the post tilting means or other equipment.

If switch 128 is open, which is the case when the truck is stationary (both motors 100 and 102 being inoperative), then motor 110 and its associated pump 108 may alternatively be put into operation through the closing of any of the switches 24S, 26S or 28S which are in parallel with switch 128.

From the foregoing explanation, it will be appreciated that an operator of a truck having this novel type of driving means whether that of FIG. 1 or FIG. 5 may accurately and delicately control the truck speed from a full stop through an inching condition, through slow or fast acceleration, without the jolting that is characteristic of conventional resistor controls. Furthermore, the efficiency of a variable speed fluid motor through the low speed range is better than that achieved by variable speed direct current motors. Finally, when the truck has been accelerated by the fluid motor to substantially full speed, the drive is automatically and smoothly shifted over to direct electric motor drive. Since the electric motor will pick up the drive while running at full speed, the efficiency will be at a maximum. The overall result is longer battery life, longer truck life due to smooth operation, and longer electric motor life because of substantially constant speed, relatively low temperature and uniform load.

It is intended to cover all changes and modifications of the examples of the invention herein chosen for purposes of the disclosure which do not constitute departures from the spirit and scope of the invention.

I claim:

1. A sequential drive system for driving the transmission of a wheeled vehicle, said system comprising a continuously operating electric motor, a normally open clutch between said electric motor and said transmission, a fluid pump driven by said motor, a fluid motor fixed to said transmission in driving relationship, piping from said pump to said fluid motor, means associated with said piping for varying the speed of said fluid motor from zero to maximum to vary correspondingly the speed of said vehicle, means for maintaining said clutch in open position until the speed of said vehicle under said fluid motor drive has increased to a speed at which said electric motor running at substantially matching speed may take over the drive of the vehicle, and means for causing engagement of said clutch and means for rendering said fluid motor ineffective as a source of driving power when said vehicle and electric motor matching speeds have been reached.

2. A sequential drive system for driving the transmission of a wheeled vehicle, said means comprising a gear in said transmission, means for driving said gear comprising a substantially constant speed electric motor having a shaft with a first cooperating gear thereon for driving said transmission gear, a clutch for disconnecting said electric motor from said cooperating gear, a fluid pump driven continuously by said electric motor, a fluid motor mounted on said transmission and having a second cooperating gear for driving said transmission gear, piping extending from said fluid pump to said fluid motor, means for varying the speed of said fluid motor, and means for maintaining said clutch in disengaged position so long as the vehicle is moving at speeds substantially slower than the matching speeds of said electric motor and vehicle.

3. Sequentially operable means for first accelerating a wheeled vehicle from zero speed to a relatively high speed and then maintaining it at said high speed, said means comprising a fluid motor effective to start said vehicle and accelerate it close to said high speed and a direct drive electric motor for driving said vehicle at said high speed while said fluid motor is rendered ineffective, said means comprising a single electric motor running continuously at a substantially constant speed, a pump driven by said motor, piping from said pump to said fluid motor, means associated with said piping for varying the said fluid motor speed from zero to said top speed, said electric motor having a drive to the transmission of said vehicle, said drive including a clutch, said clutch being disengaged while said fluid motor is driving said vehicle at less than the matching speeds of said electric motor and vehicle, means for causing said clutch to engage when said vehicle has reached said matching speed, and means for simultaneously rendering said fluid motor drive ineffective.

4. Means for driving the transmission of a wheeled vehicle comprising an electric motor operating at a substantially constant speed, a fluid motor in driving relation with the said transmission, a fluid pump driven continuously by said electric motor, piping between said pump and said fluid motor, means for varying the speed of said fluid motor from zero to maximum, means for by-passing fluid from said pump from the line to said fluid motor whereby said motor may be placed in a non-driving condition, other means driven by said electric motor directly connected with said transmission, said other means including a clutch which is disengaged when said fluid motor is driving said vehicle, and means causing engagement of said clutch when said fluid motor is placed in a non-driving condition.

5. A sequential drive system for driving the transmission of a wheeled vehicle, said system comprising a first electric motor, a fluid pump driven by said first motor, a second electric motor having its shaft in geared engagement with the transmission of said vehicle, a fluid motor mounted on the other end of the shaft of said second electric motor, a clutch between said second electric motor and said fluid motor, piping connecting said fluid pump and said fluid motor, means for varying the speed of said fluid motor from zero to a relatively high speed whereby starting and accelerating of said vehicle will be effected by said fluid motor, means for energizing said second electric motor and disengaging said clutch when the speed of said vehicle has increased to that at which it substantially matches the speed of said second electric motor when energized.

6. A sequential drive system for driving the transmission of a wheeled vehicle, said system comprising a first electric motor, a fluid pump driven by said first motor, a second electric motor having its shaft in geared engagement with the transmission of said vehicle, a fluid motor mounted on the other end of the shaft of said second electric motor, a clutch between said second electric motor and said fluid motor, piping connecting said fluid pump and said fluid motor, a valve for reversing the fluid flow to said fluid motor, means for varying the speed of said fluid motor from zero to a relatively high speed whereby starting and accelerating of said vehicle in the selected direction will be effected by said fluid motor, means for energizing said second electric motor to agree in rotation with the direction in which said vehicle is moving and disengaging said clutch when the speed of said vehicle has increased to that at which it substantially matches the speed of said second electric motor when energized.

7. A sequential drive system for driving the transmission of a wheeled vehicle comprising at least one substantially constant speed battery driven electric motor, a foot actuated switch for placing said motor in operation, a variable output fluid pump actuated by said motor, a foot actuated lever for varying the fluid output of said pump, a fluid motor driven by the output of said pump whereby the vehicle may be accelerated from stationary to a maximum speed determined by said pump output, a second switch operable only when said vehicle has reached the said maximum speed under the driving force of said fluid pump and fluid motor, said second switch being in an electrical circuit including means for causing said fluid motor to become inoperative as a driving force for said vehicle and for simultaneously connecting said vehicle transmission to a substantially constant speed electric motor whose speed at the time said fluid motor becomes inoperative will be matched to that of the said vehicle, and means for automatically restoring the operativeness of said fluid motor as a driving force upon the opening of said second switch.

8. The system set forth in claim 7 and in which the means for causing said fluid motor to become inoperative as a driving force comprises a clutch between said fluid motor and said vehicle transmission, said clutch being actuated by electrical means under the control of said second switch.

9. The system set forth in claim 7 and in which the means for causing said fluid motor to become inoperative as a driving force comprises an electrically actuated by-passing valve under the control of said second switch whereby the fluid from said pump is diverted from said fluid motor.

10. The system set forth in claim 7 and in which the means for causing said fluid motor to become inoperative when said vehicle has reached maximum speed and for shifting the drive to the substantially constant speed electric motor comprises an electrically controlled clutch associated with the drive shaft of said fluid motor.

References Cited
UNITED STATES PATENTS

| | | | |
|---|---|---|---|
| 2,263,779 | 11/1941 | Jeffry et al. | |
| 2,471,122 | 5/1949 | Reynolds | 192—3.5 |
| 2,564,002 | 8/1951 | Gibson | 180—65 |
| 2,839,011 | 6/1958 | Kugel | 105—96.2 |
| 3,126,988 | 3/1964 | Memmer | 74—733 |
| 3,129,781 | 4/1964 | Stein | 180—44 |

BENJAMIN HERSH, *Primary Examiner.*

MILTON L. SMITH, *Examiner.*